United States Patent [19]
Okuno

[11] 3,840,298
[45] Oct. 8, 1974

[54] MIRROR REFLEX VIEWFINDER PROVIDING INDICATIONS OF PHOTOGRAPHING INFORMATION

[75] Inventor: Youichi Okuno, Yokohama, Japan

[73] Assignee: Canon Kabushiki Kaisha, Tokyo, Japan

[22] Filed: Feb. 2, 1973

[21] Appl. No.: 328,892

[30] Foreign Application Priority Data
Feb. 7, 1972 Japan................................ 47-15650
June 9, 1972 Japan................................ 47-68183

[52] U.S. Cl. ................................ 354/155, 354/289
[51] Int. Cl. ............................................ G03b 17/20
[58] Field of Search ....... 95/11 V, 42, 44 R; 88/1.5; 350/286, 173; 354/55, 56, 225, 155, 289

[56] References Cited
UNITED STATES PATENTS
2,933,991   4/1960   Sauer................................ 95/42 X
3,314,345   4/1967   Ebertz et al. ..................... 95/42 X
3,387,530   6/1968   Ebertz............................... 95/42 X
3,631,784   1/1972   Jurenz............................ 95/11 V X
3,757,656   9/1973   Kuramoto........................... 95/11 V FOREIGN PATENTS OR APPLICATIONS
27,560      3/1964   Germany........................... 95/11 V
1,223,686   8/1966   Germany........................... 95/11 V Primary Examiner—Samuel S. Matthews
Assistant Examiner—Kenneth C. Hutchison
Attorney, Agent, or Firm—McGlew and Tuttle

[57] ABSTRACT

An auxiliary prism is mounted on a roof face of a pentagonal roof prism forming a mirror reflex viewfinder. The auxiliary prism has a light entry face or plane and a reflecting face or plane opposite to a front reflecting face or plane of the pentagonal prism. A light beam incident upon the light entry face of the auxiliary prism, from an indicator, is directed into the pentagonal prism by the reflecting face of the auxiliary prism and directed toward the front reflecting face of the pentagonal prism, which reflects the light beam to direct the light beam toward an eye piece. Thereby, the indicator can be observedn the visual field of the mirror reflex viewfinder.

2 Claims, 12 Drawing Figures

PRIOR ART FIG. 1
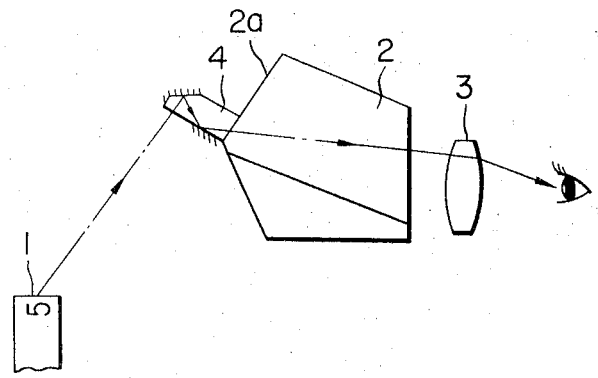
PRIOR ART FIG. 2
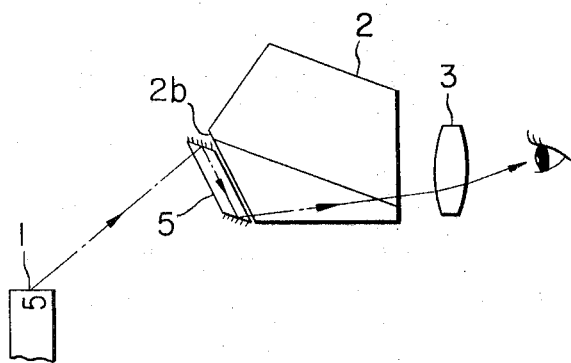
FIG. 3
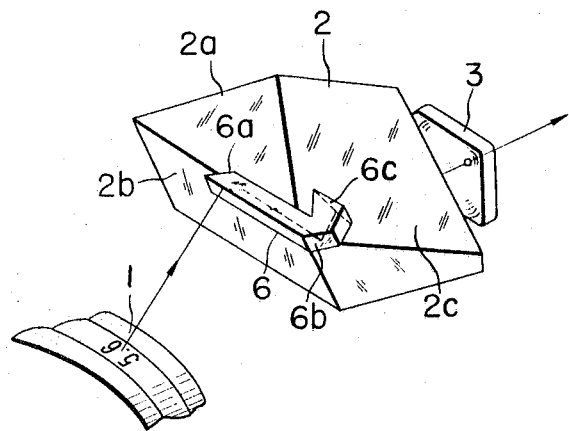
FIG. 4
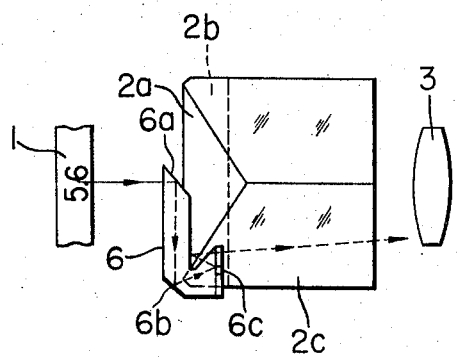
FIG. 5
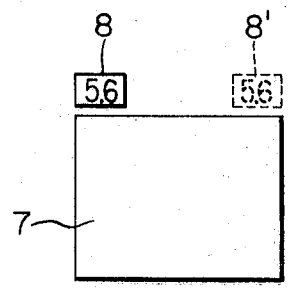

MIRROR REFLEX VIEWFINDER PROVIDING INDICATIONS OF PHOTOGRAPHING INFORMATION

FIELD AND BACKGROUND OF THE INVENTION

The present invention relates to a mirror reflex view finder for providing photographing information or indicia within the viewfinder.

In a conventional finder indication device, it has been known to supply the information, indicated on a specular or lens barrel of a lens, within a finder through an auxiliary prism positioned in front (at the lens barrel side) of a pentagonal roof prism. The device in FIG. 1 and the device in FIG. 2 are examples of this kind of conventional device. In FIG. 1, light from information 1 on a lens barrel is caused to enter a pentagonal roof prism 2 through a prism 4 positioned on an upper plane 2a at the front end of the pentagonal roof prism 2 (on a non-reflective plane of the pentagonal roof prism. The light, after entering the pentagonal roof prism, reaches the eyes through an ocular lens 3. In the example shown in FIG. 2, the information light is caused to enter the pentagonal roof prism 2 through a prism 5 which is provided in front of lower plane at the front end (second reflective plane) of the pentagonal roof prism 2. However, in these examples, the indicating position within a finder is limited to providing the indication only at the upper and lower edges of the center part of the field of view of the finder, and the example of FIG. 2 has a shortcoming in that it is unavoidable to have a projection of a considerable size formed at the front plane of the finder.

Also, a device of the kind mentioned above is known in which a prism is bonded to the roof plane of a pentagonal roof prism and information light (for example, the light from a pointer of an exposure meter provided at a side of the pentagonal prism) is brought into the first-mentioned prism from the side to direct the information light into the pentagonal roof prism, and is reflected at the roof plane at a side opposite the roof plane on which the prism is bonded. The light is then reflected at the lower plane at the front end of the pentagonal roof prism, thus indicating the information at the circumference of the viewing field of a finder.

But in this device as the light is reflected once at a roof plane, there a limitation that the position of the information as indicated in a finder, will be at the side opposite to the roof plane through which the information enters. Also since the information light beam enters into a prism from the side, it is necessary to provide an extra reflective plane for confirming the information, from the outside, other than an ocular lens. Additionally it has shortcomings such that special parts are required to use the light from the front end of a camera as the illuminating light for the information, so that the mechanism becomes large and complicated.

SUMMARY OF THE INVENTION

The present invention is intended to eliminate the shortcomings as seen in the above mentioned conventional examples, and further to make it possible to indicate the information not only at the upper or lower edge of a center part, in the case when the information is indicated within a finder, but in other places than the above. Within a pentagonal roof prism, the direction of the light flux of an objective field coming from a focal plane, within the prism, is different depending on whether the light flux comes from the right half of the bottom plane of the pentagonal roof prism or from the left half. For example, the light entering from the right half is reflected at the roof plane at the right side at the very top, then is reflected at the roof plane at the left side, and thereafter it is reflected at the bottom plane at the front end (second reflective plane) of the prism and proceeds toward an ocular lens. At this time, the roof plane will not be used in its entirety for reflection of the luminous flux, and the part near the front end of the pentagonal roof prism is not used for reflection of the luminous flux of the objective field. In the present invention a prism is provided at the above unused part to introduce the information light into the pentagonal roof prism, thus achieving the above mentioned object of the invention.

BRIEF DESCRIPTION OF THE DRAWINGS

Now examples shall be explained in detail referring to the drawings.

FIG. 1 and FIG. 2 are cross-sectional views showing outlines of arrangements of conventional viewfinder and information indicating devices.

FIG. 3 is an oblique view showing an example of the present invention.

FIG. 4 is a plan of the example shown in FIG. 3.

FIG. 5 is a front elevation showing the way the viewfinder looks when viewed in the example of FIG. 3.

DESCRIPTION OF THE PREFERRED EMBODIMENTS

Figure 6:
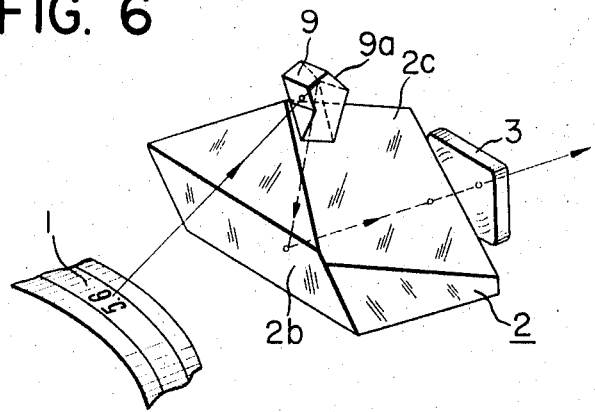
FIG. 6 is an oblique view of another example of the present invention.

In an example shown in FIG. 3 and FIG. 4, 6 is the auxiliary prism provided at a roof plane 2c of a pentagonal roof prism, having reflective planes 6a, 6b, 6c. The information light from indicia 1 on a lens barrel enters the prism 6, is reflected in turn at reflective planes 6a, 6b and 6c, and enters the pentagonal roof prism 2 through the roof plane 2c. Then the light is reflected at the lower plane 2b at the front end of the pentagonal roof prism 2 and passes through the prism to reach the eyes through the ocular lens 3.

FIG. 5 shows the manner in which the indication is seen within the viewfinder in this example, wherein 7 is a visual field of the viewfinder and 8 is the indication within the finder.

Here, it is possible to have the information appear at the reverse position (8') by introducing the information light through a roof plane which is opposite to the roof plane used in the example shown in FIG. 3.

Figure 7:
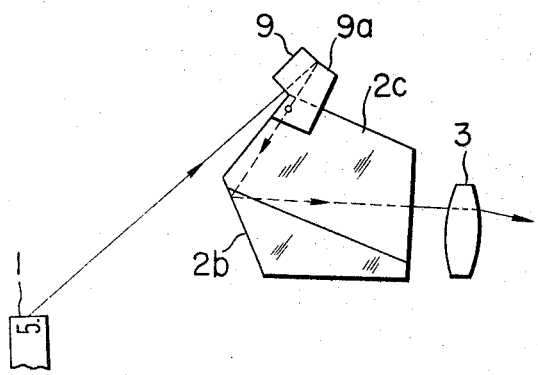
FIG. 7 is a side elevation of the example shown in FIG. 6.

FIG. 6 and FIG. 7 show another example. In this example, 9 is an auxiliary prism provided at an upper part of the roof plane 2c having one reflective plane 9a. The information light from the lens barrel enters the auxiliary prism 9, is reflected at the reflective plane 9a, then enters pentagonal roof prism 2 through the roof plane 2c, and, after being reflected at the lower plane 2b at the front end, reaches the eyes through the ocular lens 3.

Figure 8:
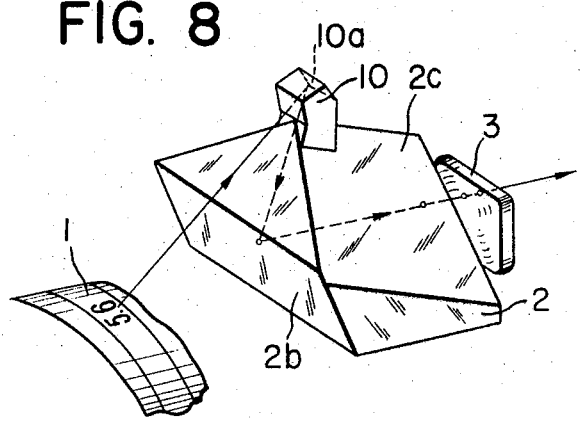
FIG. 8 is an oblique view showing still another example of the present invention.

FIG. 8 is a modification of the example shown in FIG. 6. Here a prism 10 is provided spanning the roof planes at both sides. This prism 10 has a reflective plane 10a, and the information light from the lens barrel will, after being reflected at the reflective plane 10a, enter the pentagonal roof prism through the two roof planes of the pentagonal prism, and be reflected at the lower plane 2b at the front end to reach the eyes through the ocular lens 3.

Figure 9:
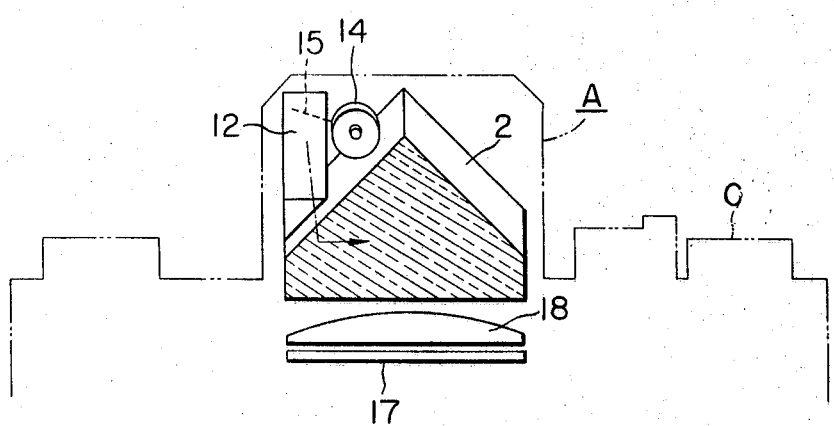
FIG. 9 is a side elevation showing a further example of the present invention.
Figure 10:
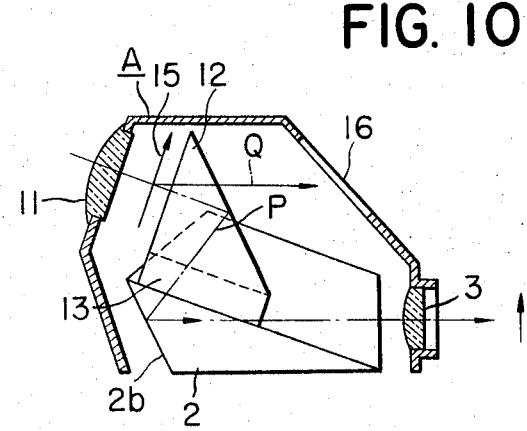
FIG. 10 is a cross-sectioned side elevation of the example shown in FIG. 9.
Figure 11:
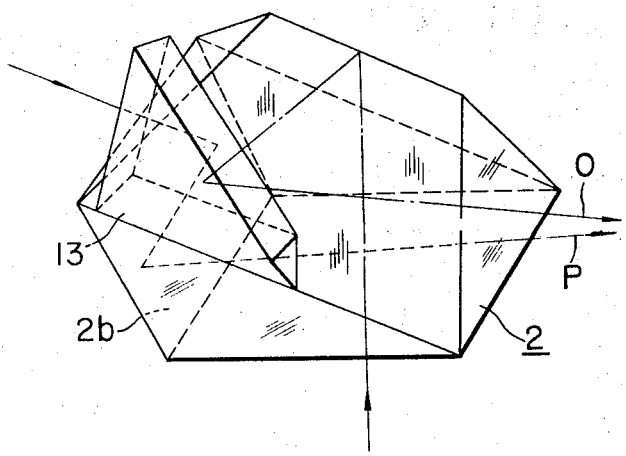
FIG. 11 is an oblique view of a pentagonal roof prism showing the reflection of the light beam in the pentagonal roof prism.

In still another example shown in FIG. 9, FIG. 10 and FIG. 11, c is a main body of a camera, 11 is a light-take-in-window formed at the front plane of a finder case A, 14 is an information source such as an exposure meter, etc., 12 is an auxiliary triangular prism bonded to the roof plane of the pentagonal roof prism 2, and 3 is an ocular lens attached to the rear plane of the finder case A, while 16 is an information-confirming window formed in the case A.

Figure 12:
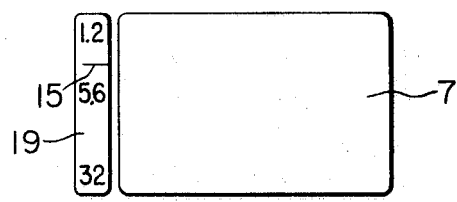
FIG. 12 is a front elevation view showing the finder field of vision in the example shown in FIG. 9.

Now, when the light from in front of or above the camera enters finder case A through the window 11, the light P, which illuminates a pointer information 15 of the meter 14, is reflected at the auxiliary prism 12, then enters pentagonal roof prism 2 through the roof plane on which prism 12 is cemented, is reflected at the lower plane 2b at the front end of the prism 2, and proceeds toward the ocular lens 3. Thus the information 19 is indicated, as illustrated in FIG. 12, at the outside of the objective field of view provided by light beam 0 which passes through a focus plane 17 and a condenser lens 18 as shown in FIG. 11 (that is, outside the objective viewing field 7).

On the other hand, the information light Q, which is refracted at and passes through prism 12, reaches a window 16. Thereby it is possible to directly confirm the erected image as being identical with the information indicated within the viewfinder by viewing through the window 16.

Since the present invention has the arrangement as mentioned above, the light in front of a camera can be used as information illuminating light, without employing a special reflective mirror, and the position in the finder field of vision at which the information is indicated can be made to coincide with the roof plane at which the information light enters. Also when the window 16 is provided in the finder case at the position to which the information light Q is refracted and enters the prism 12, the information indicated in the field of view of the viewfinder can have its accuracy in coincidence easily confirmed by looking through window 16.

While the drawing shows a case wherein the information source is provided within the finder case, for example, the photographing information on the lens barrel can be brought into a light-beam-take-in-window 11 by an additional optical system, and this information may be indicated within the viewfinder by the above mentioned arrangement of the present invention.

As explained above, the present invention provides a viewfinder on the roof plane of a pentagonal roof prism, and at a part of the roof plane which is not used for reflection in the optical path of the objective field of view of the viewfinder, so that information indicated on a lens barrel can be viewed within the viewfinder. Also, the indication can be provided at places other than the center portion or at the outer or inner circumference of the viewfinder field of vision. The present invention thus has the advantage of a wide selection of positions where the information indication, within the viewfinder, can be made available.

While specific embodiments of the invention have been shown and described in detail to illustrate the application of the principles of the invention, it will be understood that the invention may be embodied otherwise without departing from such principles.

What is claimed is:

1. In a single lens mirror reflex camera viewfinder providing therein a visual indication of photographing information, and of the type including a pentagonal roof prism having a bottom light entry face, a pair of angularly related roof reflecting faces, a first light exit face at a rear end, and a front end reflecting face oblique to the bottom light entry face and to the roof faces, the improvement comprising an auxiliary prism mounted on said roof prism and having a second light entry face directed toward a photographing information source, said auxiliary prism having two angularly related second light exit faces each in surface to surface engagement with a respective roof face of said roof prism to from respective interfaces therewith, and at least one internal reflecting face reflecting light, entering said auxiliary prism through said second light entry face, through said interface into said roof prism for reflection by said front end reflecting face through said first light exit face for projection through an ocular lens.

2. In a single lens mirror reflex camera viewfinder providing therein a visual indication of photographing information, and of the type including a pentagonal roof prism having a bottom light entry face, a pair of angularly related roof reflecting faces, a first light exit face at a rear end, and a front end reflecting face oblique to the bottom light entry face and to the roof faces, the improvement comprising an auxiliary prism mounted on said roof prism and having a second light entry face directed toward a photographing information source, at least one second light exit face in surface to surface engagement with a roof face of said roof prism to form an interface therewith, and at least one internal reflecting face reflecting light, entering said auxiliary prism through said second light entry face, through said interface into said roof prism for reflection by said front end reflecting face through said first light exit face for projection through an ocular lens; said suxiliary prism having an internal reflecting face which is semi-transparent so that a photographing information source can be observed from the outer surface of said auxiliary prism at said semi-transparent face.

* * * * *